United States Patent [19]
Harvey

[11] Patent Number: 5,059,994
[45] Date of Patent: Oct. 22, 1991

[54] TWO MAGNIFICATION THREE MASK VIEWFINDER

[75] Inventor: Donald M. Harvey, Webster, N.Y.

[73] Assignee: Eastman Kodak Company, Rochester, N.Y.

[21] Appl. No.: 683,513

[22] Filed: Apr. 8, 1991

Related U.S. Application Data

[63] Continuation of Ser. No. 601,163, Oct. 23, 1990, abandoned.

[51] Int. Cl.⁵ .............................................. G03B 13/12
[52] U.S. Cl. .................................................... 354/222
[58] Field of Search ........................................ 354/222

[56] References Cited

U.S. PATENT DOCUMENTS

| | | | |
|---|---|---|---|
| Re. 32,797 | 12/1988 | Harvey | 354/222 X |
| 2,943,549 | 7/1960 | Nerwin | 95/44 |
| 4,038,673 | 7/1977 | Schroder | 354/222 |
| 4,256,396 | 3/1981 | Kawaguchi | 354/222 |
| 4,973,997 | 11/1990 | Harvey | 354/222 X |

Primary Examiner—Michael L. Gellner
Attorney, Agent, or Firm—Roger A. Fields

[57] ABSTRACT

A photographic camera is provided with a viewfinder having two lens assemblies and a separate mask. A movable member for positioning the two lens assemblies and the mask has a first position wherein the first lens assembly is in alignment with a viewing axis, a second position wherein the second lens assembly is in alignment with the viewing axis and a third position wherein both the second lens assembly and the mask are in alignment with the viewing axis. A lost motion connection between the second lens assembly and the mask enable the second lens assembly and the mask to be aligned in the third position.

13 Claims, 3 Drawing Sheets 5,059,994

TWO MAGNIFICATION THREE MASK VIEWFINDER

This is a continuation of application Ser. No. 07/601163 filed Oct. 23, 1990 now abandoned.

CROSS REFERENCE TO RELATED APPLICATION

Reference is made to commonly assigned copending U.S. Application Ser. No. 601,549 entitled "View Finder Mode Selector and Shutter Release Mean" and filed concurrently herewith in the name of Donald M. Harvey.

TECHNICAL FIELD

This invention relates to viewfinders for photographic cameras and more particularly to viewfinders for pseudo tele/pseudo pan cameras.

BACKGROUND ART

In U.S. Pat. No. 4,652,104 entitled "Pseudo Format Camera With Zoom Finder," there is disclosed a basic pseudo pan/pseudo tele camera. In such a camera it is desirable for the user to see in the viewfinder the scene which will ultimately appear in the print as a result of magnification and/or masking of the negative during the printing process. With a tele/pan camera the tele and pan negative to print magnifications are equal but are substantially different from that of a normal photograph. Accordingly it is desirable for the viewfinder to employ one optical system for normal photography and a second optical system for tele and pan viewing.

While the same optical system can be used for both pan and tele it is desirable to have the field of view adjusted so that the user sees that portion of the scene to be printed in each mode. Accordingly, it is desirable for the finder to have two optical magnifications (one for normal viewing and one for pseudo pan/tele viewing) and three field defining masks (one for normal viewing, one for tele viewing and one for pan viewing).

The prior art discloses apparatus for selectively moving one or more lenses into an optical path. However, the prior art does not reach a solution to the problem of selectively moving one of two optical systems into an optical path and selectively moving one of three field defining masks into the optical path.

DISCLOSURE OF THE INVENTION

In accordance with the invention a movable means is provided for selectively positioning two lens assemblies and at least one mask. The movable means has a first position wherein a first lens assembly is in alignment with a viewing axis, a second position wherein a second lens assembly is in alignment with the viewing axis and a third position wherein the second lens assembly and the mask are in alignment with the viewing axis.

BRIEF DESCRIPTION OF THE DRAWINGS

Other objects and advantages of the invention will become apparent from the following description taken in connection with the accompanying drawings wherein.

MODE FOR CARRYING OUT THE INVENTION

Figure 1:
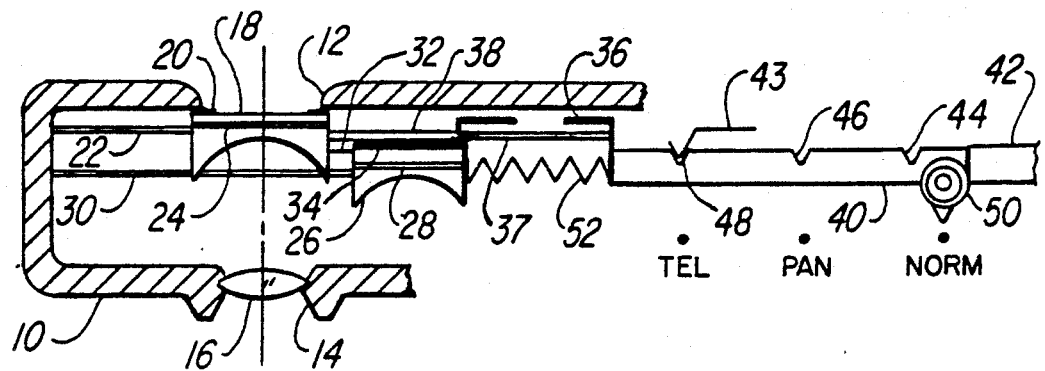
FIG. 1 is a schematic illustration of a camera body incorporating a viewfinder in accordance with the present invention.

Referring to FIG. 1 of the drawings there is shown a camera body 10 having a viewing aperture 12 and an eye aperture 14 aligned on an optical axis or viewing axis. An eye lens 16 is mounted in the aperture 14. A normal objective lens assembly 18 comprising one or more lens elements is shown aligned with the viewing aperture 12 and the eye lens 16. The lens assembly 18 is provided with a mask 20 for establishing a normal field of view. The lens assembly 18 is movable mounted by means of slots 22 in the camera body engaged by ribs 24 on the lens housing. Such mounting enables the lens assembly 18 to be displaced to the left as viewed in FIG. 1 to the position shown in FIG. 2 wherein the lens assembly engages an end wall of the camera body and is out of the viewing axis. The camera body thus defines a stop means for limiting movement of the lens assembly 18.

A second pan/tele objective lens assembly 26 having a ribs 28 engaging slots 30 on the camera body 10 is mechanically coupled to the normal lens assembly 18 by linkage 32. By means of such coupling the two lens assemblies will move as a unit and lens assembly 26 will move to the left to the position shown in FIG. 2 into the optical axis as assembly 18 moves to the left. When assembly 26 is so positioned the viewfinder will be set for pan/tele viewing.

Figure 2:
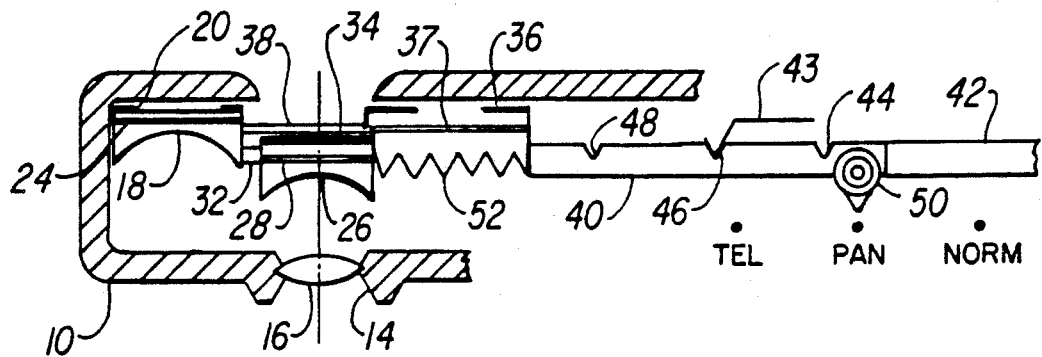
FIGS. 2 and 3 are views similar to FIG. 1 showing the parts in different operative positions.

Lens assembly 26 is provided with a pan mask 34 which defines the field of view when the viewfinder is in the pan viewing mode shown in FIG. 2. An independently mounted tele mask 36 having a more narrow field of view and having ribs 37 received by slots 38 in the camera body is movable to the position shown in FIG. 3 to reduce the field of view of the lens assembly 26 and establish the tele field of view.

Figure 3:
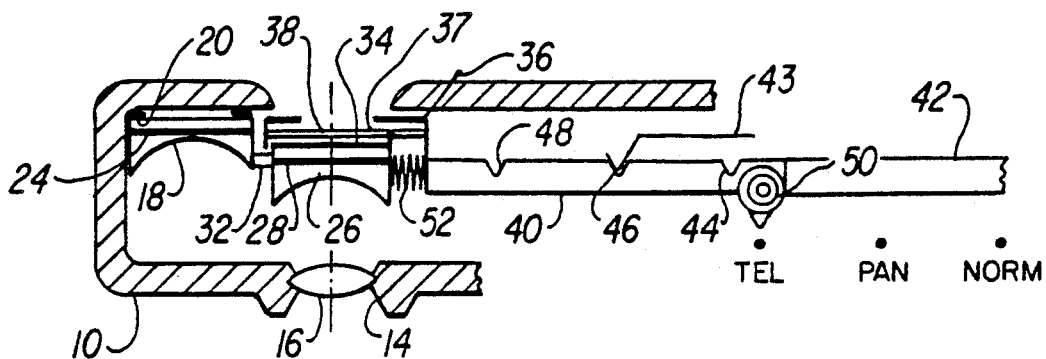

To accomplish positioning of the lens assemblies 18 and 26 and mask 36 an actuating means comprising a bar 40 is slidably mounted in a slot 42 for rectilinear movement from a first position (normal viewing) shown in FIG. 1 to a second position (pan viewing) shown in FIG. 2 and to a third position (tele viewing) shown in FIG. 3. A detent means comprising a spring arm 43 engagable with notches 44, 46 and 48 serves to latch the bar 40 in each position. A knob 50 is provided on the bar 40 to enable it to be manually displaced. Mask 36 is attached to the end of the bar 40 to be movable therewith. Also the end of bar 40 is connected to lens assembly 26 by a lost motion coupling means comprising a spring 52.

In operation the parts will be in the positions shown in FIG. 1 in the normal viewing mode. The normal objective lens assembly 18 will be aligned with the viewing aperture and, the mask 20 will define the normal field of view. To establish the pan viewing mode bar 40 is moved to the left until spring 43 engages notch 42. The parts will now assume the positions shown in FIG. 2. Normal lens assembly 26 will be aligned with aperture 12 and mask 34 will define the field of view for the pan viewing mode. Spring 52 is provided with sufficient resilient stiffness to prevent relative displacement of the assembly 26 relative to the end of the bar 40 and mask 36 will remain out of the viewing axis as shown in FIG. 2.

To establish the tele viewing mode the bar 40 is moved further to the left until the spring 42 engages notch 48. The parts will now assume the position shown in FIG. 3. Since normal lens assembly 18 is in engagement with the camera body, no movement of the lens assemblies occurs when the bar is moved from its FIG. 2 position to its FIG. 3 position. Consequently displacement of the bar compresses spring 52 and moves the mask 36 in front of mask 34 to reduce the effective width of the aperture 12 and define the tele field of view.

If the bar 40 is moved to the right from the position shown in FIG. 3 to the pan position mask 36 will be carried with it and move out of the viewing axis to restore the pan viewing condition. Spring 52 will be extended to the condition shown in FIGS. 1 and 2. Further movement of the bar will displace the lens assemblies by means of the coupling provided by spring 52 and return the parts to the normal viewing mode.

Figure 4:
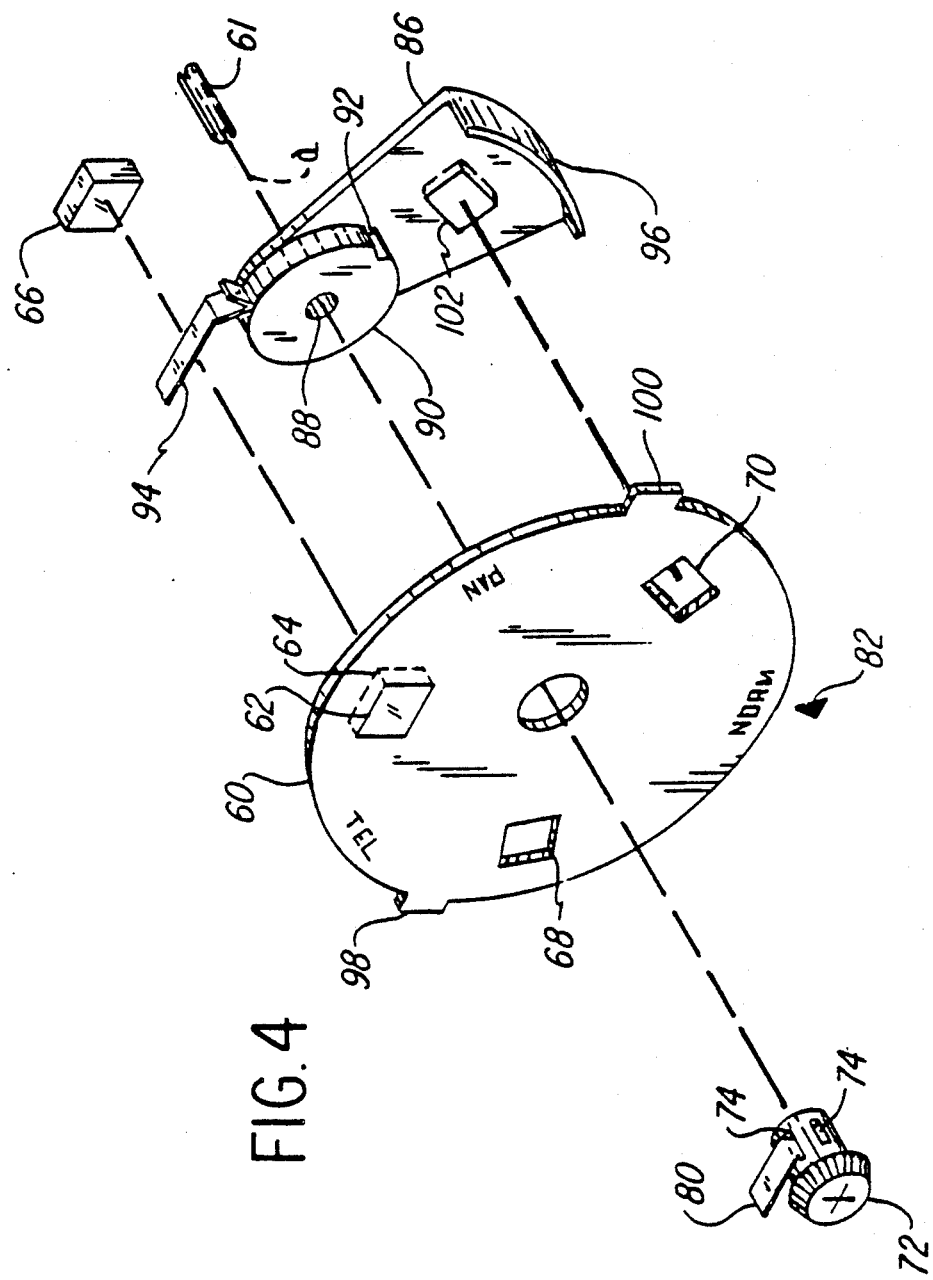
FIG. 4 is an exploded perspective view of another embodiment of the viewfinder in accordance with the invention.

Referring to FIG. 4 of the drawings there is shown another embodiment of the viewfinder wherein rotary motions are utilized to effect positioning of two lens assemblies and associated masks. In this embodiment a circular plate 60 is rotatably mounted on the camera body by means of a shaft 61 to be rotatable about a central axis. A normal objective lens assembly 62 and mask 64 are mounted on the plate 60 adjacent its circumference. In the angular position of the plate 60 shown in FIGS. 4 and 5, the objective lens assembly 62 and mask 64 will be aligned with an eye lens 66 and will thus be positioned to permit normal scene viewing.

A pan mask 68 and a tele mask 70 are also mounted on the plate 60 adjacent its circumference. The lens assembly 62, tele mask 70 and pan mask 68 are located in equal radially spaced relationship. Rotation of the plate 60 clockwise will serve to sequentially position the masks 68 and 70 into the viewing axis (a). A selector knob 72 having three angularly spaced recesses 74 adapted to be engaged by a detent leaf spring 80 is fixed to the disc 60 for positioning the same. The recesses also have equally radial spacing and define the normal, pan and tele viewing positions of the disc 60. A fiducial 82 on the camera body in combination with radially spaced letters N, T and P on the disc 60 serves to indicate the viewing mode of the viewfinder.

A cam plate 86 having a circular opening 88 is also mounted on shaft 61 for rotation about the same axis as plate 60. The cam plate 86 is provided with a cardioid cam 90 having a captive depression 92 and a captive range of approximately 120 degrees encompassing depression 92. A leaf spring 94 has one end fixed to the camera body and an opposite follower end portion adapted to ride on the surface of cam 90.

The cam plate 86 is provided with a curved flange 96 which has a radius of curvature slightly larger than that of plate 60 and is positioned in close proximity to the periphery of plate 60. The opposite ends of flange 96 are adapted to be engaged by a pair of tabs or lugs 98 and 100 extending from the periphery of plate 60 as described in more detail below. A tele/pan objective lens assembly 102 is mounted on the cam plate 86 at a radius from the rotational axis equal to that of the lens assembly 62 and masks 68 and 70.

Figure 5:
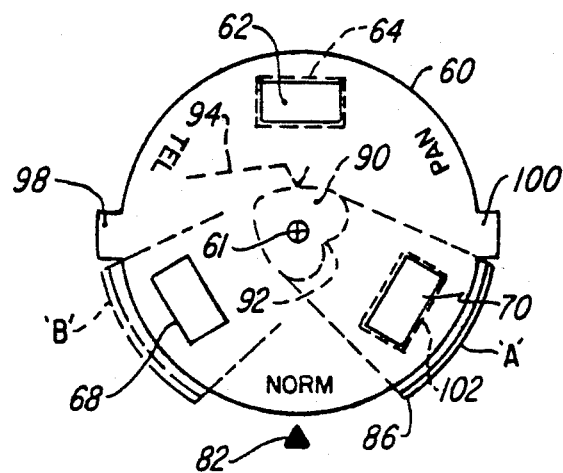
FIGS. 5, 6 and 7 are front elevations showing the normal, pan and tele positions of the embodiment illustrated in FIG. 4.

In operation of the FIG. 4 embodiment the parts will be in the positions shown in FIG. 4 and 5 in the normal viewing mode. Normal objective lens assembly 62 and mask 64 will be aligned with the eye lens 66. Cam plate 86 will be positioned with the flange 96 engaging tab 100. Tabs 98 and 100 will be at 9 o'clock and 3 o'clock positions, respectively. As viewed in FIGS. 4 and 5, spring arm 80 will engage one of the notches 74 to releasably latch the disc 60 in a position for normal viewing.

Figure 6:
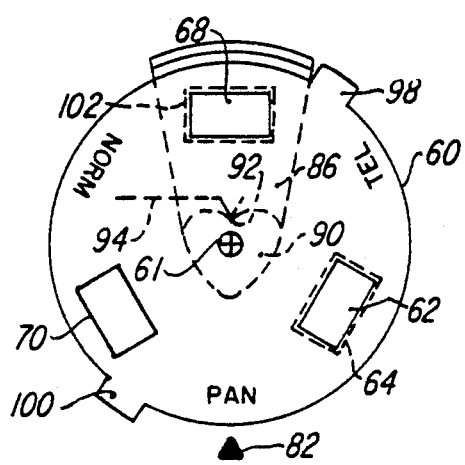

If it is desired to switch to a pan viewing mode, selector knob 72 will be rotated clockwise, as viewed in FIG. 4, to rotate plate 60 clockwise to position pan mask 68 in alignment with the eye lens 66. Leaf spring 80 will engage a recess 74 to releasably retain the plate 60 in its new position. During rotation of the disc 60 to position pan mask 68 into alignment with the eye lens 66 tab 100 will rotate cam plate 86 clockwise. Such rotation of the plate 86 will cause the follower end portion of leaf spring 94 to be captured by the cardioid cam and cam plate 86 will rotate clockwise under the force of spring 94 until the follower end portion of the spring 94 is seated in depression 92. When the follower end portion is so seated the cam plate 86 will have rotated 180 degrees and the tele/pan objective lens assembly 102 will be aligned with the pan masks 68 and eye lens 66 as shown in FIG. 6. Thus the view finder will be set for pan viewing.

Figure 7:
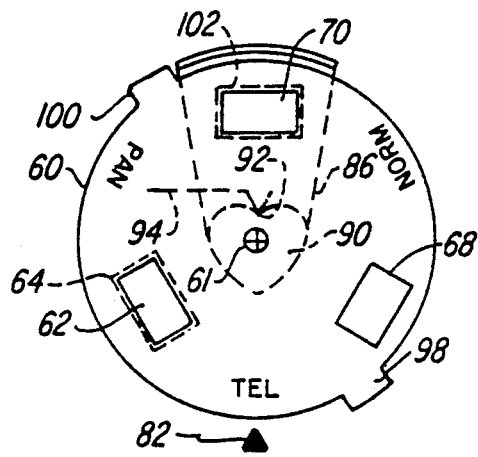

To set the viewfinder for the tele viewing the knob 72 may be rotated until the detent spring 80 engages the next recess 74. Such rotation of the knob 72 will rotate plate 60 to the position shown in FIG. 7 wherein tele mask 70 is aligned with the eye lens 66. During this movement of the plate 60 neither of the tabs 98, 100 will engage cam plate 86 and no movement of the plate 86 will occur. Accordingly the lens assembly 102 will remain in the viewing axis and the viewfinder will be set for tele viewing.

If it is desired to return the viewfinder to the normal viewing mode, the knob 72 may be rotated further clockwise to position the normal lens assembly 62 into alignment with the eye lens 66. This rotation of knob 72 and plate 60 will cause tab 100 to again engage flange 96. The plate 86 will be rotated to release the end follower of spring 94 from the capture range of cam 90 to permit continued rotation of the cam plate 86 until it assumes the position shown in FIG. 4. Thus the viewfinder will again be set for normal viewing.

It will be apparent that the knob 72 can be rotated counter clockwise to sequentially placed the viewfinder in tele and pan viewing masks. During such rotation the tab 98 will engage the left end of flange 98.

It will now be apparent that the cardioid cam and tabs 93 and 100 provides an effective lost motion coupling which permits the tele and pan masks to be used with a single tele and pan objective lens assembly with minimum complexity.

Those skilled in the art to which the invention relates will appreciate that various substitutions and modifications can be made to the described embodiment without departing from the spirit and scope of the invention as described by the claims below.

I claim:

1. In a viewfinder for a photographic camera having a viewing axis and first and second objective lens assemblies moveable into alignment with the viewing axis, the improvement comprising:

a mask defining a field of view for the viewfinder; and
moveable means coupled to said lens assemblies for selectively positioning said lens assemblies and said mask into alignment with the viewing axis, said movable means having a first position wherein said first lens assembly is in alignment with the viewing axis, a second position wherein said second lens assembly is in alignment with said viewing axis, and a third position wherein said mask and said second lens assembly is in alignment with the viewing axis.

2. In a viewfinder for a photographic camera including a viewing axis, first and second objective lens assemblies movable into alignment with the viewing axis and first and second masks associated with said first and second lens assemblies for defining the field of view of said first and second lens assemblies respectively, the improvement comprising:
 a third mask defining a field of view different than said first and second masks; and
 movable means coupled to said lens assemblies and said mask for selectively positioning said first and second lens assemblies and their associated masks into alignment with said viewing axis, said movable means having a first position wherein said first lens assembly is in alignment with said viewing axis, a second position wherein said second lens assembly is in alignment with said viewing axis and a third position wherein said third mask and said second lens assembly are in alignment with said viewing axis.

3. In a viewfinder as claimed in claim 2 wherein said first lens assembly is fixed to said second lens assembly and said third mask is fixed to said movable means, the improvement further including yieldable means coupling said movable means to said first and second lens assemblies.

4. In a viewfinder as claimed in claim 3 further including stop means engaged by said first lens assembly when said second lens assembly is aligned with said viewing axis, to inhibit movement of said lens assemblies, said yieldable means being yieldable for permitting movement of said moveable means from said second position to said third position to position said third mask into alignment with said viewing axis while said second lens assembly is aligned with said viewing axis.

5. In a viewfinder as claimed in claim 4 wherein said yieldable means comprises a spring having sufficient stiffness to permit said moveable means to position said first and second lens assemblies without yielding prior to engagement of said first lens assembly with said stop means.

6. In a viewfinder as claimed in claim 5 wherein said movable means comprises an elongated bar coupled to said first and second lens assemblies by said spring, said third mask being fixed to one end of said bar.

7. In a viewfinder for a photographic camera having a viewing axis, first and second objective lens assemblies and first and second masks defining different fields of view, the improvement comprising:
 a first rotatable member for supporting the first objective lens assembly and the first and second masks in radially spaced relationship, said first rotatable member being rotatable to selectively position the first lens assembly and the first and second masks into alignment with the viewing axis;
 a second rotatable member for supporting the second lens assembly;
 lost motion means coupling said first and second rotatable members for effecting rotation of said second rotatable member to position said second lens assembly into alignment with the viewing axis when said first rotatable member rotates to position the first mask into alignment with the viewing axis and for retaining said second optical assembly in alignment with the viewing axis when the first rotatable member rotates to position the second mask in the viewing axis.

8. In a viewfinder as claimed in claim 7 wherein said lost motion means comprises:
 cardioid cam means having a predetermined captive range associated with said second rotatable member;
 first abutment means on said first rotatable member; and
 second abutment means on said second member adapted to be engaged by said first abutment means.

9. A viewfinder as claimed in claim 8 wherein said first and second rotatable members comprise first and second rotatable plates respectively and said first abutment means comprises a pair of tabs on said first plate and said second abutment means comprises a flange on said second plate, one of said tabs being effective to rotate said second plate into the captive range of said cardioid cam means, said cam means being effective upon movement of said second plate into said captive range to position said second plate to position the first mask into the viewing axis.

10. A viewfinder for a photographic camera including a viewing axis, said viewfinder comprising;
 a first lens means for normal viewing;
 a second lens means for pan and tele viewing;
 a tele mask defining a field of view for the viewfinder during tele viewing;
 movable means coupled to said first and second lens means and said mask, said movable means having a first position wherein said first objective lens means is in alignment with the viewing axis, a second position wherein said second lens means is in alignment with the viewing axis, and a third position wherein said mask and said second lens means are aligned with the viewing axis.

11. In a viewfinder as claimed in claim 10 wherein said first lens means includes a normal mask defining the field of view during normal viewing, said second lens means includes a pan mask defining the field of view during pan viewing, said tele mask being effective to reduce the field of view of said pan mask in said third position of said movable means.

12. In a viewfinder as claimed in claim 11 wherein said first lens means is coupled to and movable with said first lens means and said tele mask is fixed to said movable means and wherein the viewfinder further includes a last motion connection coupling said movable means to said first and second lens means to permit movement of said tele mask into alignment with said second lens means during movement of said moveable means from said second to said third position.

13. In a viewfinder as claimed in claim 12 wherein said movable means comprises an elongated member and said tele mask is attached to said member and said last motion connection comprises a spring coupling said elongated member to said first and second lens means.

* * * * *

UNITED STATES PATENT AND TRADEMARK OFFICE
CERTIFICATE OF CORRECTION

PATENT NO. : 5,059,994

DATED : October 22, 1991

INVENTOR(S) : Donald M. Harvey

It is certified that error appears in the above-identified patent and that said Letters Patent is hereby corrected as shown below:

Column 4, line 47, delete "placed" and insert --place--.

Column 4, line 48, delete "masks" and insert --modes--.

Column 4, line 49 delete "flange 98" and insert --flange 96--.

Column 4, line 66 after "assemblies" insert --and said mask--.

Column 6, line 14 delete the colon ":" and insert a semicolon --;--.

Signed and Sealed this

Tenth Day of August, 1993

Attest:

MICHAEL K. KIRK

Attesting Officer

Acting Commissioner of Patents and Trademarks